United States Patent [19]

Lagace

[11] 3,752,417
[45] Aug. 14, 1973

[54] AIRCRAFT USING LIFTING FANS
[76] Inventor: Prejean Lagace, Rural Rt. 2, Hamilton, Ontario, Canada
[22] Filed: June 23, 1972
[21] Appl. No.: 265,903

[52] U.S. Cl. ............ 244/12 C, 244/12 R, 244/12 B, 244/23 B, 244/23 C, 244/52
[51] Int. Cl. ............................................ B64c 29/00
[58] Field of Search ................... 244/12, 13, 15, 23, 244/52, 55, 17.23, 17.25; 180/116, 117

[56] References Cited
UNITED STATES PATENTS
1,585,281  5/1926  Craddock.......................... 244/23 R
3,262,657  7/1966  Anker-Holth..................... 244/23 B Primary Examiner—Milton Buchler
Assistant Examiner—Barry L. Kelmachter
Attorney—Stanley J. Rogers

[57] ABSTRACT

An aircraft of VTOL or STOL type is provided with at least one vertically extending duct in the fuselage containing an upper and a lower fan. Air valve means between the fans divide the duct into upper and lower regions and control the air from the upper fan to flow downward and/or into a duct extending rearwardly from the upper region. Other air valve means control the flow of air from a front duct into the lower region.

7 Claims, 2 Drawing Figures

Patented Aug. 14, 1973 3,752,417
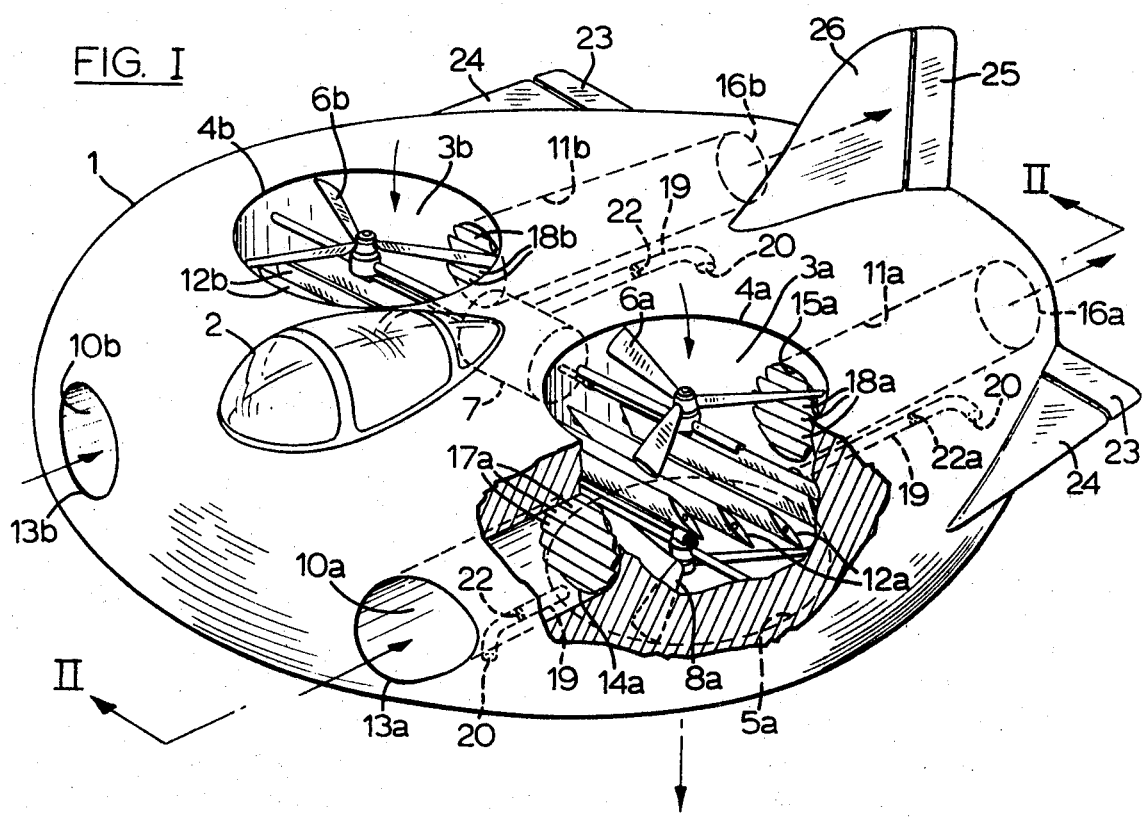
FIG. I
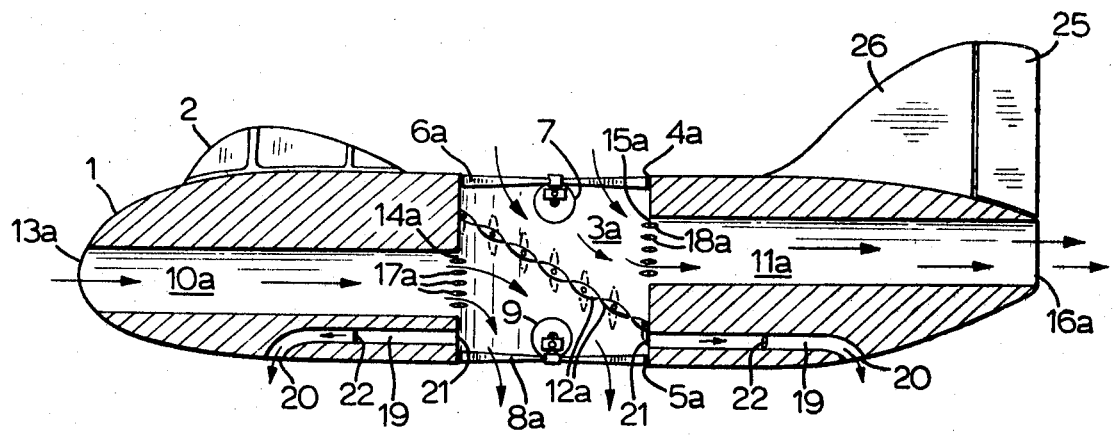
FIG. II

AIRCRAFT USING LIFTING FANS

FIELD OF THE INVENTION

The present invention relates to aircraft and, more particularly, to a combination of a novel propulsion system with an aircraft which is capable of propelling the aircraft forwardly and is also capable of providing vertical lift to permit vertical take-off or short runway take-off, as desired.

REVIEW OF THE PRIOR ART

Both vertical take-off and landing (VTOL) aircraft and short take-off and lading (STOL) aircraft are, as such, no longer new. In fact, many types of VTOL and STOL aircraft have been proposed, and certainly some have been successful. The advantage of such an aircraft is, of course, that it requires no long runways and is usually much more maneuverable in flight than conventional aircraft.

One such prior art VTOL aircraft is disclosed by P.G. Kappus in U.S. Pat. No. 2.932,468, issued on Apr. 12, 1960 to General Electric Company. The Kappus aircraft employs a jet engine located mounted within a horizontal air duct in the aircraft fuselage to drive an angularly mounted fan at the rear of the aircraft in the outlet of the duct. A set of control vanes mounted in the exit plane of the duct are controlled to guide the air discharged by the fan and therefore to direct the consequent propulsion thrust for vertical, level, and other attitudes in flight.

DEFINITION OF THE INVENTION

The invention seeks broadly and generally to provide an aircraft which is easily controllable and which is designed to permit vertical lift, hovering, and level forward flight.

More particularly, the present invention seeks to provide an aircraft which uses two independently driven fans or sets of fans to move large quantities of air to provide motive power for all attitudes of flight.

Still another object is to provide such an aircraft wherein, for lift-off or hovering, substantially all the fan-driven air can be expelled downwardly out of the fuselage, while for forward flight, the air from one fan is expelled rearwardly from the fuselage and the air from the other fan is expelled downwardly from the fuselage.

To achieve these and other objects, the present invention provides an aircraft comprising:

a load-carrying fuselage;

a substantially vertically extending duct having an inlet at the upper surface of the fuselage and an outlet at the lower surface thereof;

an upper fan within the vertical duct adjacent the inlet thereof, said upper fan being operable to draw air downwardly into said vertical duct;

first engine means connected in driving relationship to said upper fan;

a lower fan within said vertical duct adjacent the outlet thereof, said lower fan being operable to expel air downwardly out from said vertical duct;

second engine means connected in driving relationship to said lower fan;

a front duct having an inlet at the front of said fuselage and an outlet opening into said vertical duct;

a rear duct having an inlet from said vertical duct and a rearwardly directed outlet;

first air valve means disposed within and dividing said vertical duct into an upper region, which includes the upper fan and the rear duct inlet, and a lower region, which includes the lower fan and the front duct outlet, said first air valve means being selectively actuable between an open position permitting air flow from the upper fan to the lower fan and a closed position directing air drawn by the upper fan to flow through the rear duct and causing air expelled by the lower fan to be drawn from the front duct;

steering control means operable to control the direction and attitude of the aircraft in flight.

According to a preferred aspect of the invention, second air valve means is provided within the front duct and third air valve means is provided within the rear duct to selectively block air flow through these ducts during lift-off and hovering.

According to another preferred embodiment of the invention, the aircraft is provided with a pair of vertical ducts, each provided with an upper fan, a lower fan and first air valve means as aforesaid, and each in communication with a front duct and a rear duct. Preferably, the upper fans of both vertical ducts are driven by the first engine means, and the lower fans of both vertical ducts are driven by the second engine means.

DESCRIPTION OF THE DRAWINGS

For a better understanding of the present invention and its advantages, reference may be made to the following detailed description of an illustrative embodiment thereof, taken in conjunction with the appended drawings wherein:

FIG. 1 is a top perspective view of one embodiment of the invention with part of the aircraft fuselage cut away to expose elements of the propulsion system:

FIG. 2 is a cross-sectional view in elevation taken along section II — II of FIG. 1.

DESCRIPTION OF THE PREFERRED EMBODIMENTS

In the description which follows, like reference characters denote similar parts throughout the figures of the drawings.

FIGS. 1 and 2 show an aircraft having a load-carrying fuselage 1 which is suitably constructed and arranged not only to accommodate a pilot and passengers (for which purpose a cockpit 2 may be provided) or freight, as desired, but also to carry the propulsion system and to withstand the stresses induced thereby during flight. The fuselage may also carry wheels, pontoons or landing gear (not shown) in any suitable form for supporting the aircraft when it is at rest on the ground or on water.

In order to provide motive power for all attitudes of flight, the propulsion system preferably comprises a pair of large substantially vertical, ducts 3a, 3b each having an inlet 4a, 4b on the upper surface of fuselage 1 and an outlet 5a, 5b on the lower surface thereof (outlet 5b is not illustrated in the drawings). An upper fan 6a, 6b is mounted within each vertical duct 3a, 3b adjacent the inlet 4a, 4b thereof and is operable to draw air downwardly into each vertical duct 3a, 3b. First engine means 7 is connected in driving relationship to each upper fan 6a, 6b. In this instance a single first engine 7, which may expediently be of the internal-combustion type, is employed to drive both upper fans 6a, 6b. It should, however, be understood that each upper fan 6a, 6b may be operatively connected to, and driven by, a separate engine.

In similar fashion, a lower fan 8a, 8b (the latter is not illustrated) is also mounted within each vertical duct 3a, 3b, respectively, adjacent the outlet 5a, 5b and is operable to expel air downwardly out from each vertical duct 3a, 3b. As for the upper fans 6a, 6b, a single second engine means 9 is connected in driving relationship to each of lower fans 8a, 8b.

The arrangement described hereinabove with reference to the drawings provides lifting thrust to the aircraft by drawing air downwardly in large quantities into each inlet 4a, 4b, propelling it with force through ducts 3a, 3b, and expelling it through outlets 5a, 5b. Arrangements may now be described which provide forward thrust and permit maneuverability and steering of the aircraft.

To provide forward thrust, each vertical duct 3a, 3b is provided with a front duct 10a, 10b, a rear duct 11a, 11b, and a first air valve means 12a, 12b. Since vertical ducts 3a and 3b are structurally and functionally similar, the following description will be restricted to duct 3a and elements cooperating therewith. Referring then to FIG. 2, it can be seen that front duct 10a has an inlet 13a at the front of the fuselage and an outlet 14a opening into vertical duct 3a. Rear duct 11a has an inlet 15a opening from vertical duct 3a and a rearwardly directed outlet 16a. First air valve means 12a, in this instance a series of air vanes, serve to divide the space within duct 3a into an upper region, which includes upper fan 6a and rear duct inlet 5a, and a lower region, which includes lower fan 8a and front duct outlet 14a. First air valve means 12a is selectively actuable to control air flow through vertical duct 3a. When first air valve means 12a is in a fully open position (as indicated in phantom), it permits free air flow from upper fan 6a to lower fan 8a. When the vanes of first air valve means 12a are in a closed position, air drawn by upper fan 6a is directed to flow through rear duct 11a (and thus provides forward thrust), while air expelled through outlet 5a by lower fan 8a is caused to be drawn from front duct 10a (and thus provides vertical lift).

As illustrated, second air valve means 17a, 17b (the latter is not shown) are preferably provided within front ducts 10a, 10b and are operable to prevent air flow from vertical ducts 3a, 3b to and through front ducts 10a, 10b during lift-off and hovering. Similarly, third air valve means 18a, 18b are disposed within, and block air flow through, rear ducts 11a, 11b during lift-off and hovering (i.e., during the time that first valve means 12a, 12b are open). As will be understood, second and third air valve means 17a, 17b, 18a, 18b function during vertical flight to prevent pressurized air within vertical ducts 3a, 3b from escaping through front ducts 10a, 10b and rear ducts 11a, 11b.

Since some air flow through the front ducts 10a, 10b and rear ducts 11a, 11b is needed during horizontal and generally any non-vertical flight, second air valves 17a, 17b and third air valves 18a, 18b should be least partly open during such flight.

In order to provide controlled steering and maneuverability for the aircraft, suitable steering control means are provided for both vertical flight and horizontal flight.

For vertical flight, as during lift-off and hovering, the steering control means preferably comprises at least three steering ducts 19 having outlets 20 which surround the center of gravity of the aircraft and which are, of course, directed along lines that do not pass through the center of gravity, as will be understood by those skilled in the aeronautical art. The inlet 21 of each steering duct 19 opens onto one of vertical ducts 3a, 3b which, during vertical flight, contain pressurized air in quantity. Controlled air valves 22 within steering ducts 19 may be actuated independently to control the air flow out of each outlet 20 and thereby steer and maneuver the aircraft during vertical flight.

For horizontal flight, the steering means may expediently comprise conventional ailerons 23 on wings 24 and a rudder 25 on tail fan 26, which may be operated in the usual way.

As will be understood, arrows are used throughout the drawings to indicate the directions of the various air flows used for propulsion and steering.

In operation, when vertical lift is desired, the air drawn by upper fans 6a, 6b is ducted through vertical dicts 3a, 3b (and through first vave means 12a, 12b which are open) and expelled downwardly in large quantities by lower fans 8a, 8b. As the craft rises, air is selectively ducted through steering ducts 19 to provide the necessary steering control and stability. To change to forward flight, the vanes of first valve means 12a, 12b are moved into closed position (and air valves 17a, 17b, 18a, 18b are opened) as the speed of the lower fan 8a, 8b is increased to compensate for the decrease in vertical thrust from the upper fans 6a, 6b, whose power is increasingly being used for driving the aircraft forward by expelling air through rear ducts 11a, 11b. Vertical thrust is, of course, provided by air drawn through front ducts 10a, 10b and expelled by lower fans 8a, 8b through outlets 5a, 5b. For lower fuel consumption during horizontal flight, conventional wings can be provided so as to utilize the additional lift afforded thereby in accordance with Bernoulli's principle.

While the illustrated aircraft employs two side-by-side propulsion systems each comprising a vertical duct, upper fan, lower fan, front duct, rear duct, and air valve means, it will be understood that the novel aircraft may employ either one or more than two such propulsion systems. Wings or corresponding lifting surfaces can be provided to supplement the lift provided by the fans, as required, as will be apparent to those skilled in the art.

I claim:
1. An aircraft comprising:
    a. a load-carrying fuselage;
    b. a substantially vertically extending duct having an inlet at the upper surface of the fuselage and an outlet at the lower surface thereof;
    c. an upper fan within the vertical duct adjacent the inlet thereof, said upper fan being operable to draw air downwardly into said vertical duct;
    d. first engine means connected in driving relationship to said upper fan;
    e. a lower fan within said vertical duct adjacent the outlet thereof, said lower fan being operable to expel air downwardly out from said vertical duct;
    f. second engine means connected in driving relationship to said lower fan;
    g. a front duct having an inlet at the front of said fuselage and an outlet opening into said vertical duct;
    h. a rear duct having an inlet from said vertical duct and a rearwardly directed outlet;

i. first air valve means disposed within and dividing said vertical duct into an upper region, which includes the upper fan and the rear duct inlet, and a lower region, which includes the lower fan and the front duct outlet, said first air valve means being selectively actuable between an open position permitting air flow from the upper fan to the lower fan and a closed position directing air drawn by the upper fan to flow through the rear duct and causing air expelled by the lower fan to be drawn from the front duct;

j. steering control means operable to control the direction and attitude of the aircraft in flight.

2. An aircraft as claimed in claim 1, wherein second air valve means are provided within said front duct and third air valve means are provided within said rear duct, the second and third air valve means being selectively actuably to block air flow through the front and rear ducts during vertical flight of the aircraft.

3. An aircraft as claimed in claim 1, wherein said steering control means comprises at least three steering ducts having outlets which surround the center of gravity of the aircraft and inlets which open onto said vertical duct, each steering duct comprising an independently actuable air valve for controlling air flow through the steering duct.

4. An aircraft as claimed in claim 3, wherein second air valve means are provided within said front duct, and third air valve means are provided within said rear duct, the second and third valve means being selectively actuably to block air flow through the front and rear ducts during vertical flight of the aircraft.

5. An aircraft as claimed in claim 1 and comprising: a pair of spaced substantially vertical ducts; an upper fan within each vertical duct; first engine means connected in driving relationship to both upper fans; a lower fan within each vertical duct; second engine means connected in driving relationship to both lower fans; and first air valve means disposed within and dividing each vertical duct into upper and lower regions.

6. An aircraft as claimed in claim 5, wherein said steering control means comprises at least three steering ducts having outlets which surround the center of gravity of the aircraft and inlets open onto said vertical duct, each steering duct comprisng an independently actuable air valve for controlling air flow through the steering duct.

7. An aircraft as claimed in claim 5, wherein second air valve means are provided within said front duct and third air valve means are provided within said rear duct, the second and third air valve means being selectively actuably to block air flow through the front and rar ducts during vertical flight of the aircraft.

* * * * *